US011294610B2

(12) United States Patent
Kluepfel

(10) Patent No.: US 11,294,610 B2
(45) Date of Patent: Apr. 5, 2022

(54) METHOD FOR FLEXIBLE PROCESSING OF A JOB QUEUE

(71) Applicant: Heidelberger Druckmaschinen AG, Heidelberg (DE)

(72) Inventor: Martin Kluepfel, Hockenheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/166,507

(22) Filed: Feb. 3, 2021

(65) Prior Publication Data

US 2021/0240408 A1 Aug. 5, 2021

(30) Foreign Application Priority Data

Feb. 5, 2020 (EP) .................................... 20155548

(51) Int. Cl.
*G06F 3/06* (2006.01)
*G06F 3/12* (2006.01)

(52) U.S. Cl.
CPC ............ *G06F 3/126* (2013.01); *G06F 3/1203* (2013.01); *G06F 3/1286* (2013.01)

(58) Field of Classification Search
CPC ...... G06F 3/126; G06F 3/1267; G06F 3/1218; G06F 3/1203
USPC ..................................... 358/1.15, 1.14, 1.16
See application file for complete search history.

(56) References Cited

U.S. PATENT DOCUMENTS

| 5,821,924 | A  | * | 10/1998 | Kikinis ................... G06F 1/325 345/212 |
|---|---|---|---|---|
| 5,897,260 | A  |   | 4/1999 | Zingher |
| 8,810,811 | B2 |   | 8/2014 | Weber |
| 9,898,232 | B2 |   | 2/2018 | Has et al. |
| 2004/0008359 | A1 | * | 1/2004 | Christiansen ......... G06F 3/1244 358/1.13 |
| 2004/0136030 | A1 | * | 7/2004 | Gassho ................. G06F 3/1259 358/1.15 |
| 2008/0188978 | A1 | * | 8/2008 | Zamanian ............... G06F 3/126 700/221 |
| 2011/0007347 | A1 | * | 1/2011 | Kamath ................. G06F 3/1262 358/1.15 |
| 2012/0008167 | A1 |   | 1/2012 | Field |

FOREIGN PATENT DOCUMENTS

| DE | 102014116313 A1 | 5/2016 |
|---|---|---|
| DE | 102015118139 A1 | 10/2016 |
| DE | 102017205470 A1 | 10/2018 |
| EP | 0748689 A2 | 12/1996 |
| EP | 2159683 A1 | 3/2010 |
| WO | 2018136101 A1 | 7/2018 |

\* cited by examiner

*Primary Examiner* — Jamares Q Washington
(74) *Attorney, Agent, or Firm* — Laurence A. Greenberg; Werner H. Stemer; Ralph E. Locher

(57) ABSTRACT

A method for an automated production of printing substrates on at least one printing machine having at least one computer, includes feeding print jobs to the computer in a printer job queue. The computer analyzes the print jobs in the printer queue in terms of defined minimum numbers before the print jobs are processed and the print jobs are not processed on the printing machine until a threshold of a defined minimum number is attained.

10 Claims, 1 Drawing Sheet

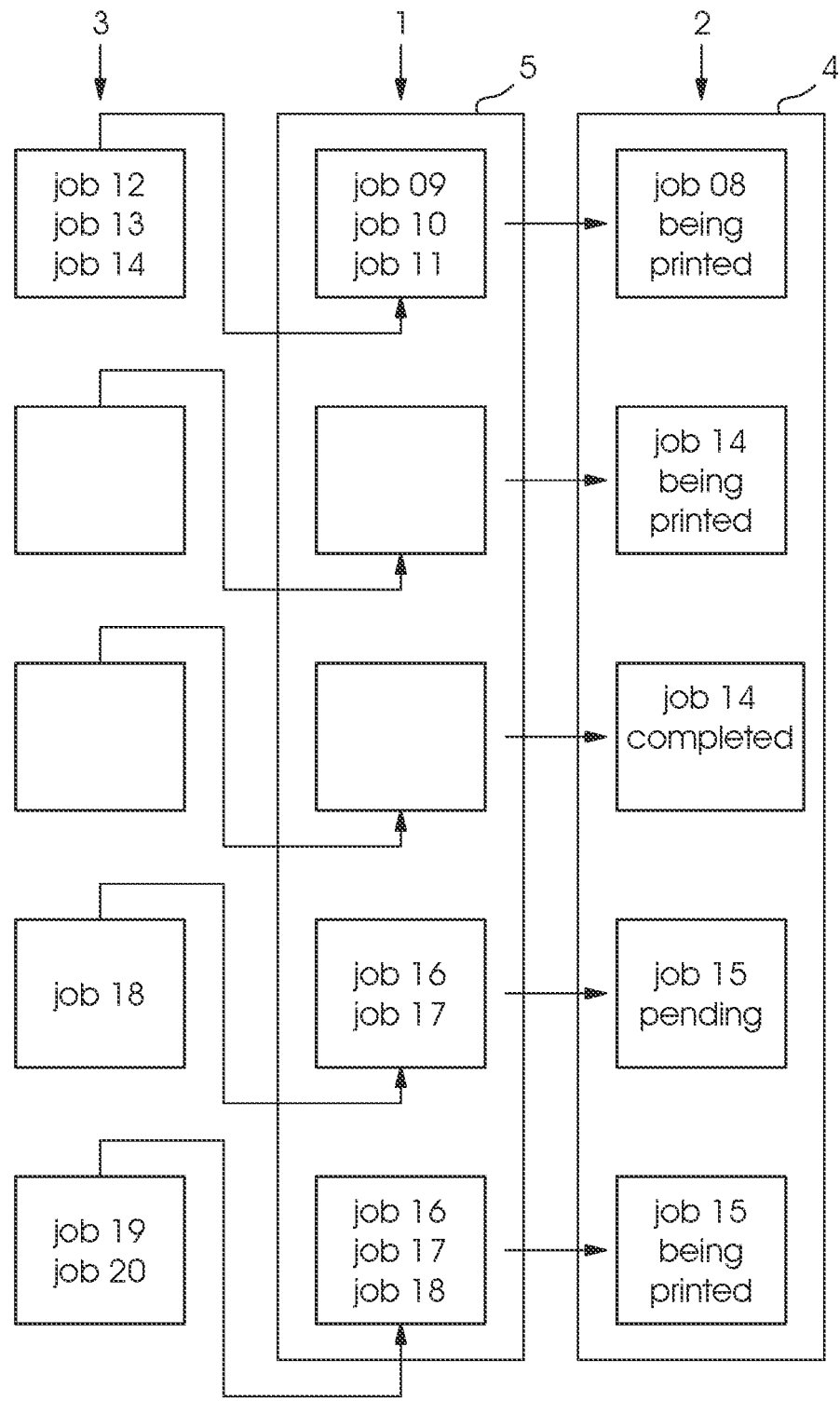

METHOD FOR FLEXIBLE PROCESSING OF A JOB QUEUE

CROSS-REFERENCE TO RELATED APPLICATION

This application claims the priority, under 35 U.S.C. § 119, of German Patent Application EP 20 155 548, filed Feb. 5, 2020; the prior application is herewith incorporated by reference in its entirety.

BACKGROUND OF THE INVENTION

Field of the Invention

The present invention relates to a method for an automated production of printing substrates on at least one printing machine including at least one computer, in which print jobs are fed to the computer in a printer job queue.

Modern print shops are equipped with multiple printing machines and machinery for the further processing of printed products. Network connections are provided for communication between the machinery, workstations, and the Internet. Customers use the Internet to send print jobs to the print shop where they are processed by the machinery. Based on the job data, print jobs are allocated to the machine that is most suitable for processing the print job. In order to be able to operate in an economical way, usually a number of print jobs are successively processed on a printing machine. The print jobs allocated to a printing machine are processed in a printer queue just as is the case with office printers. The printer or printing machine then successively processes the print jobs in the printer queue. As soon as all print jobs in the printer queue have been completed, the office printer or printing machine is switched to a standby mode. For office printers, that is easy because after a short warm-up, an office printer may easily return from a standby to a printing mode once there are new print jobs pending in the printer queue. For industrial printing machines, however, in particular lithographic offset printing machines or other printing machines with printing plates, it is less easy because extensive set-up operations are required to start up the printing machine, among them changing printing plates and creating and removing ink profiles in the individual printing units of the printing machine. Especially when an offset printing press is in a standby mode for a longer period of time, the distribution of ink in the printing units for the subsequent printing operation needs to be set in a correct way because otherwise many unusable prints would be produced. When an offset printing machine is frequently switched on and off, the result is that the number of unusable prints increases considerably.

BRIEF SUMMARY OF THE INVENTION

It is accordingly an object of the invention to provide a method for an automated production of printing substrates on at least one printing machine having at least one computer, which overcomes the hereinafore-mentioned disadvantages of the heretofore-known methods of this general type and which provides a way of processing print jobs in a printer queue while avoiding the production of unusable prints due to frequent switches between a standstill mode and a printing mode.

With the foregoing and other objects in view there is provided, in accordance with the invention, a method for an automated production of printed products on at least one printing machine having at least one computer receiving print jobs in a printer queue, wherein before processing print jobs in the printer queue, the computer analyzes the print jobs in the printer queue in terms of required minimum numbers, and the print jobs are not processed on the printing machine until a threshold of predefined minimum numbers is attained.

This provides a way of ensuring that the printing machine is only switched into the printing mode when a minimum number for the printing operation is attained, thus ensuring that no inordinate number of unusable prints is created because the print volume is too small. A certain number of unusable products is created whenever the printing machine is switched on. This number is especially significant when the number of products to be printed is small. Against this background, the invention envisages that the minimum number is selected to be large enough for the ratio between sellable printing substrates and unusable printing products to be economically viable.

A first advantageous embodiment of the invention envisages that the defined minimum number includes a number of printed pages. For instance, it makes sense to set a minimum number of 1000 pages before an offset printing machine that produces 50 pages of unusable prints when it is switched out of the standby mode is restarted, thus limiting the usable/unusable ratio to a maximum of 5%. For this purpose, the print jobs added to the printer queue are analyzed in terms of the number of printed pages and the print jobs are not processed by the printing machine until the defined minimum number of printed pages in the queue is attained.

An alternative embodiment of the invention envisages that the defined minimum number includes a number of printed products. For instance, a minimum number of 100 products to be printed may be set and unless this number is attained, the printing machine will not be restarted. This means, for instance, that a brochure of a minimum circulation of 100 copies needs to be printed for the printing machine to be activated. If there are two brochures in the queue, 50 copies of every brochure are clearly sufficient in this example. The minimum number may in turn depend on the configuration of the printed products. For instance, large brochures with many pages may require a smaller minimum number than brochures of only a few pages.

A further embodiment of the invention envisages that the minimum number includes a number of print jobs. For instance, a defined minimum number may be the number of five print jobs. This means that the printing machine will not be reactivated until a minimum of five print jobs are queued up.

Expediently, the minimum number is defined as a function of the characteristics of the printing machine on which the print jobs will be processed, in particular the number of unusable prints that it creates. The lower the number of unusable prints a printing machine produces when it is started up, the smaller the minimum number may be. For instance, offset printing machines create a lot more unusable prints than digital printing machines such as inkjet printing machines, which may even attain sellable-quality pages from the first print on. Yet even for digital printing machines, it may make sense to define a minimum number of more than one page, because when a digital printing machine is started up, a number of measuring operations are carried out and it takes a comparatively long time for the printing machine to start up and deliver the first print. In such a case, it makes sense to avoid the long preliminary phase by waiting for a specific number of print jobs before the machine is started, which means that one time-consuming warm-up phase is sufficient for processing a number of print jobs in immediate succession.

A particularly advantageous embodiment of the present invention envisages that the computer is part of an online cloud solution or system. The computer for controlling the print jobs in the printer queue and for forwarding the jobs to the printing machine does not necessarily have to be the computer of the printing machine itself. It may be any available computer in the print shop or even part of an online cloud solution or system. As a function of the selected printing machine, the cloud computer only forwards the accumulated print jobs to the printing machine for successive processing as soon as the threshold of the defined minimum number is reached.

Advantageously, it is further envisaged that the printing machine is in an activatable standby mode in which the computer may switch the machine into an operating mode at any time. The machine needs to be activatable by the computer for the computer to be able to switch the printing machine to the operating mode when the defined minimum number is attained. For this purpose, the printing machine is in an activatable standby mode, allowing the computer to switch it into a printing mode in an automated way without any operator intervention at any time. However, this does not prevent the operator from being prompted to carry out specific manual operations such as printing plate changes or filling ink into a printing unit when the printing machine is started up. When such a manual operator intervention is required, the control unit of the printing machine preferably emits an audio or visual signal to prompt the operator to carry out the required manual operations.

Other features which are considered as characteristic for the invention are set forth in the appended claims.

Although the invention is illustrated and described herein as embodied in a method for flexible processing of a job queue, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE SEVERAL VIEWS OF THE DRAWING

The FIGURE of the drawing is a diagram illustrating how multiple print jobs in a printer queue are processed by a printing machine including a computer.

DETAILED DESCRIPTION OF THE INVENTION

Referring now in detail to the single FIGURE of the drawing, it is seen that the left-hand column of the FIGURE illustrates a job list 3 of print jobs fed to a computer 5, which may be at the print shop or a part of an online cloud solution or system. Software on the computer 5 controls a printer queue 1 of an associated printing machine 4. The printer queue 1 in the middle column includes all print jobs to be processed by the printing machine 4. Thus, the middle column includes all print jobs that are in the printer queue 1. The right-hand column contains a current print job 2 that is being processed on the printing machine 4.

The computer 5 uploads the pending print jobs in the job list 3 into the printer queue 1 in an automated way. The first row shows that there are three print jobs in the printer queue 1 while a current print job 2 is currently being processed on the printing machine 4. In addition, one can see that there are three further print jobs in the job list 3 pending for being uploaded into the printer queue 1. The second row of the FIGURE shows that at this point, the last print job from the first row is being processed and no other print jobs are pending either in the printer queue 1 or in the job list 3. Thus, the last print job in the third row is being processed on the printing machine 4 as the current print job 2 and subsequently, the computer 5 will switch the printing machine 4 into the standby mode.

After a certain amount of time, new print jobs are uploaded into the printer queue 1 in the fourth row, and a first print job 2 is already being prepared for the printing machine 4. However, since neither the printer queue 1 nor the job list 3 contain enough print jobs, the current print job that has been prepared for the printing machine 4 is not yet being processed and is still pending. The fifth row shows that in the meantime, three print jobs are present in the printer queue 1 and two further print jobs are pending in the job list 3. In this case, the defined minimum number of four print jobs to be processed has been reached, namely the pending print job 2 on the printing machine 4 and the three print jobs in the printer queue 1, and the printing machine 4 starts to process the current print job 2. In the exemplary embodiment shown in the FIGURE, the defined minimum number is a measure of four print jobs in the printer queue 1.

Alternatively, a defined number of pages may be given as the minimum number. In this case, the computer 5 analyzes the pending print jobs in the printer queue 1 in terms of the number of pages and starts the processing of the current print job 2 on the printing machine 4 as soon as the minimum number of print pages is attained in the queue 1.

This prevents disruptions due to a lack of print jobs in the printer queue 1 and ensures that the printing machine 4 is not continuously being switched from the standby mode to the printing mode just because of one or two jobs. The printing machine 4 is not switched back from the standby mode to the printing mode until sufficient print jobs are pending so that a starting up of the printing machine does not create an inordinate amount of unusable prints.

The following is a summary list of reference numerals and the corresponding structure used in the above description of the invention:

1 printer queue of the printing machine
2 current print job on the printing machine
3 job list of the printing machine
4 printing machine
5 computer

The invention claimed is:

1. A method for automated production of printed products on at least one printing machine, the method comprising:
   feeding print jobs in a printer queue to a computer of a printing machine;
   before processing the print jobs, using the computer to analyze the print jobs in the printer queue in terms of defined minimum numbers;
   processing the print jobs on the printing machine only after reaching a threshold of a defined minimum number; and
   defining the minimum number as a function of characteristics of the printing machine on which the print jobs will be processed.

2. The method according to claim 1, wherein the defined minimum number includes a number of printed pages.

3. The method according to claim 1, wherein the defined minimum number includes a number of printed products.

4. The method according to claim 1, wherein the minimum number includes a number of print jobs.

5. A method for automated production of printed products on at least one printing machine, the method comprising:
   feeding print jobs in a printer queue to a computer of a printing machine;
   before processing the print jobs, using the computer to analyze the print jobs in the printer queue in terms of defined minimum numbers;
   processing the print jobs on the printing machine only after reaching a threshold of a defined minimum number; and
   defining the minimum number as a function of unusable prints created on the printing machine on which the print jobs will be processed.

6. The method according to claim 1, which further comprises providing the computer as part of an online cloud system.

7. The method according to claim 1, which further comprises providing the printing machine as an offset printing press.

8. The method according to claim 1, which further comprises providing the printing machine as a digital printing machine.

9. The method according to claim 1, which further comprises providing the printing machine as an inkjet printing machine.

10. The method according to claim 1, which further comprises using the computer to automatically switch the printing machine between an activatable standby mode and a printing mode at any time.

\* \* \* \* \*